(No Model.)
O. M. HUSTED.
FENCE MAKING MACHINE.
No. 414,319. Patented Nov. 5, 1889.
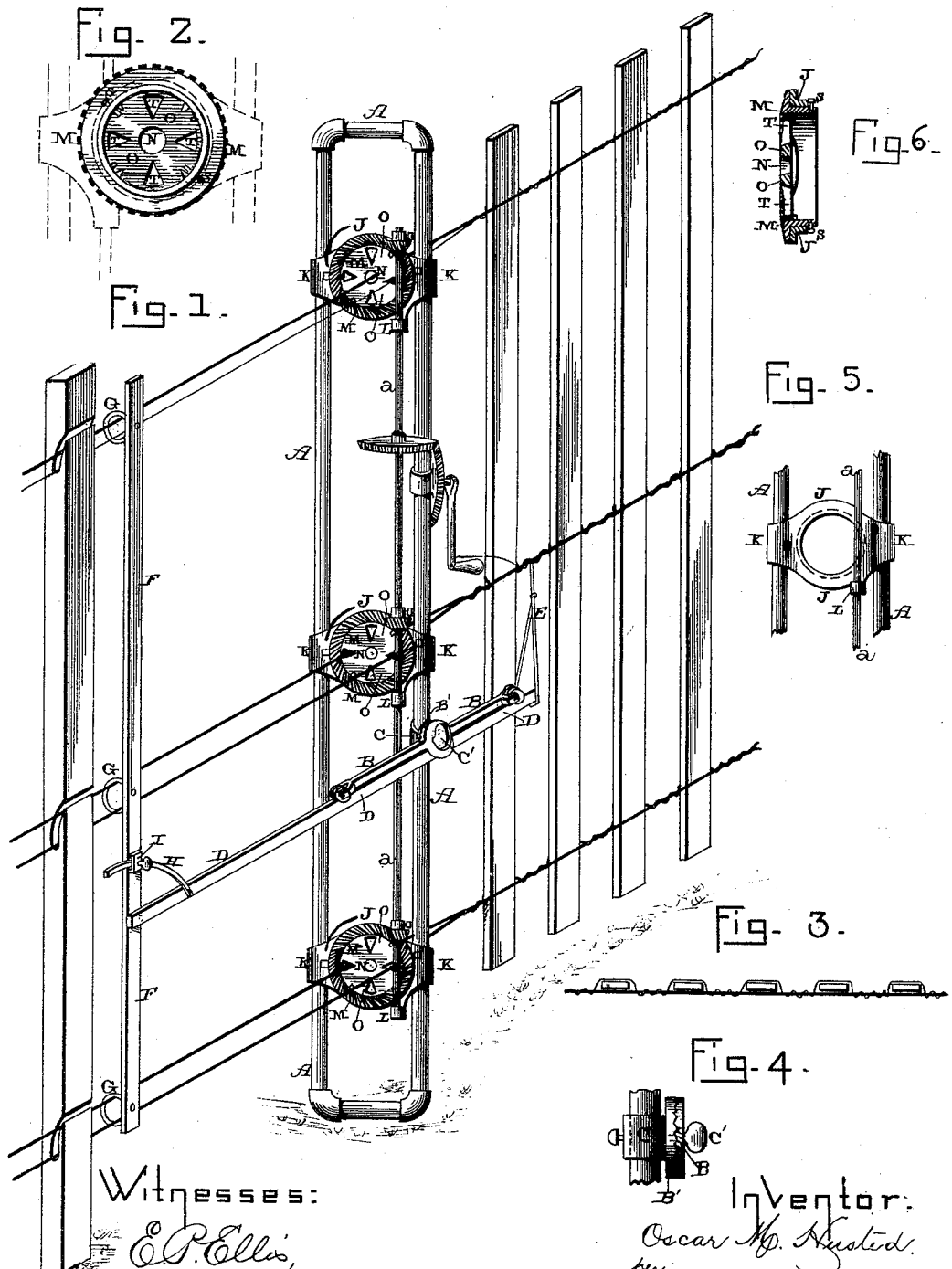

UNITED STATES PATENT OFFICE.

OSCAR M. HUSTED, OF HOLLY, MICHIGAN.

FENCE-MAKING MACHINE.

SPECIFICATION forming part of Letters Patent No. 414,319, dated November 5, 1889.

Application filed February 8, 1889. Serial No. 299,197. (No model.)

*To all whom it may concern:*

Be it known that I, OSCAR M. HUSTED, of Holly, in the county of Oakland and State of Michigan, have invented certain new and useful Improvements in Fence-Making Machines; and I do hereby declare the following to be a full, clear, and exact description of the invention, such as will enable others skilled in the art to which it pertains to make and use it, reference being had to the accompanying drawings, which form part of this specification.

My invention relates to an improvement in fence-making machines; and the objects of my invention are to provide the machine with a supporting-truck and a supporting-bar upon which the truck moves, the supporting-bar being suspended from the stretched wires; to provide the operating-pinions and the twister-heads with skew-gears; to provide the twister-head with a central opening, through which a heavy wire is to be passed, and one or more openings to one side of the center, through which a lighter wire is passed, so as to enable the lighter wire to be twisted around the heavier one, and thus prevent the sagging of the panels, and to make the journals which carry the twister-heads vertically adjustable upon the frame of the machine, and to provide them with journals for the vertically-operating shaft.

Figure 1 is a perspective of a machine which embodies my invention. Fig. 2 is a detail view of the twister-head and its attachments, shown from its rear side. Fig. 3 is a plan view of the pickets, showing the position of the wires after being twisted. Fig. 4 is a detail view of the truck and its attachments. Fig. 5 is a detail view of one of the hangers. Fig. 6 is a vertical section of one of the twister-heads.

A represents a suitable frame-work, which is made of gas-pipe or any other suitable material, and to which the truck B is secured by means of a collar C and set-screw. This collar can be vertically adjusted upon one side of the frame, so as to adapt it to the position of the supporting-bar D.

The truck consists of a single rod or bar, which is provided with suitable wheels or rollers at its ends, and these wheels or rollers bear directly upon the supporting-bar D. This bar D is suspended from the stretched wires by means of a hook E at one end and by a vertical guide-bar F at the other. The bar F is much longer than the hook, and is provided with rings or guides G, for catching over each of the stretched sets of wires and preventing any lateral play or movement of the different parts, at the same time that it helps to support the machine A in position.

Pivoted to the bar D is a brace-rod H, which catches in a suitable guide I, which is prepared for it upon the rod F. By means of the rod H the bar D can be changed to any desired inclination, so as to adapt the machine to work upon hillsides or uneven ground and yet remain always perpendicular.

The truck B is provided with a corrugated surface at its center, and this surface comes in contact with a corrugated friction-disk B' on the collar C, whereby the inclination of the bar D may be changed and held at any desired angle by a set-screw C'.

Heretofore the entire weight of the machine has been supported upon the ground, upon the wires, or partially upon the ground and partially upon the wires; but I prefer to support the machine entirely above the ground, thus enabling the machine to be more readily and easily moved than can be done where the machine rests upon the ground, which is always more or less uneven, and where there are many obstructions to prevent the machine from moving straight along.

Between the two sides of the frame A are a number of hangers J, which are provided with sleeves K upon opposite sides, so as to fit over the frame, and which hangers are vertically adjustable upon the frame and are held in any desired position by means of set-screws, which pass through them to catch against the frame A. Also formed upon each of these hangers is a sleeve L, in which the vertical operating-shaft $a$ is journaled.

The hangers J consist of metallic rings or frames, in which the twister-heads M are journaled in any suitable manner, and which twister-heads are provided with skew-gears around their outer edges. Through each twister-head disk O is made a large central opening N, through which a large heavy wire is to be passed, and which is to receive no twisting movement. Through opposite sides of the disk are formed openings, through which the smaller wires which are to be twisted are passed. If a heavy wire is used and only a single lighter wire for twisting around the heavy one, then only one of the side openings will be used; but if two light wires, which are to be evenly twisted, are used in the usual manner, then the two wires will be passed through the two side openings, and the central opening will not be used at all. The object in using a heavy wire is to support the panels so that they will not sag, as is always the case where lighter wires are used. The disks O of the twister-heads are made detachable therefrom, and are held in place by any suitable means. The disks O are made detachable from the twister-heads for convenience in manufacture, and the heads being swiveled in the hangers they are free to be rotated therein. These disks are held in position in the heads by means of suitable pins or studs which catch upon opposite sides of the disks, as shown in Fig. 6. The holes T through the sides of the disk are made wedge-shaped, so that the wire which is to be twisted around the heavier one can have a lateral play, so as to allow the machine to easily pass a splice in either wire. When the pickets are being inserted, the wire will be moved outward; but as soon as the twisting strain is brought to bear upon the head the wire will move inward toward the center, and, being nearer to the center of motion, will be wrapped more closely and tightly around the heavy wire at the edges of the pickets than could be done if the wire were held stationary near the outer edge of the disk. After the twisting is finished the small wire can be opened out, as already described, so as to allow the picket to be pushed tightly against the twist which has already been formed.

Having thus described my invention, I claim—

1. The combination, with a wire-twisting machine, of a supporting-bar which is suspended from the stretched wires, and a truck which rests upon the bar and is secured to the machine, substantially as shown.

2. The combination of the supporting-bar D, suspended from the stretched wires, and the truck B, secured by means of a collar C and set-screw to the frame of the machine and made vertically adjustable thereon, substantially as described.

3. The combination of the supporting-frame A, the hangers J, provided with the sleeves K, placed thereon, the twister-heads M, provided with skew-gears, the disks O, provided with holes N T and placed inside of the twister-head, the vertically-operating rod $a$, and the pinions placed thereon and provided with skew-gears to mesh with the twister-head, the said shaft being journaled in bearings L, formed upon the hangers J, substantially as specified.

In testimony whereof I affix my signature in presence of two witnesses.

OSCAR M. HUSTED.

Witnesses:
W. H. FLETCHER,
W. V. HEUSTED.